Figure 1:
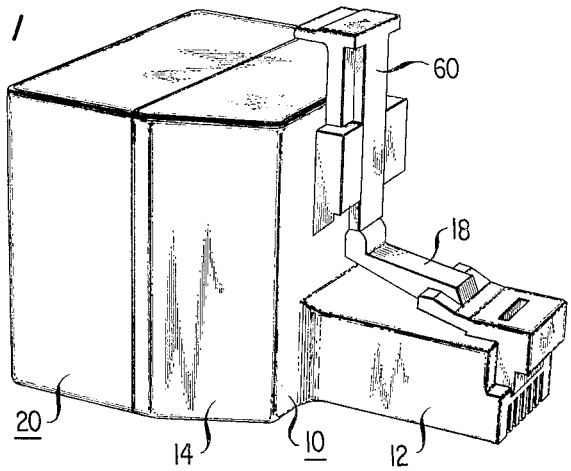
Figure 2:
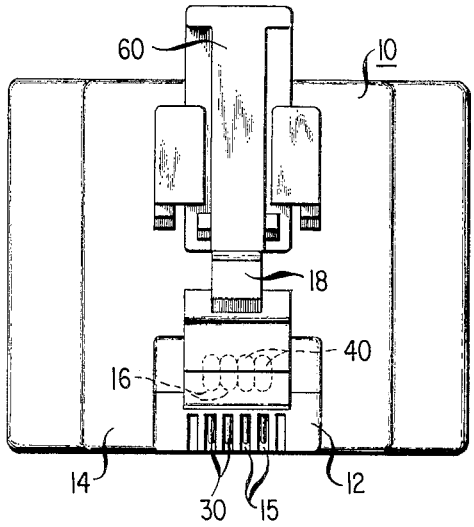
Figure 3:
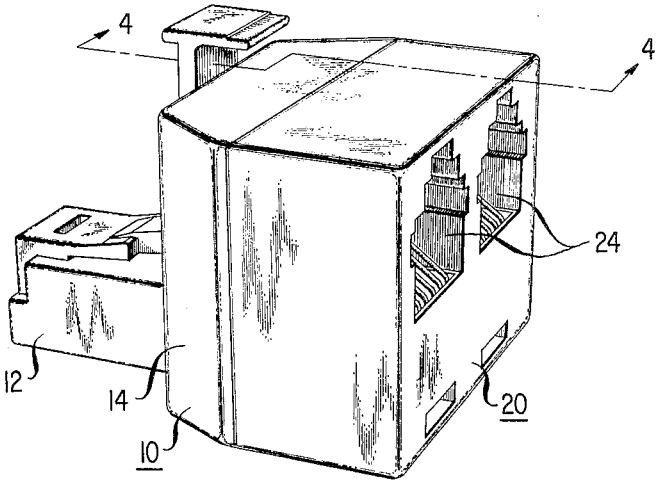
Figure 4:
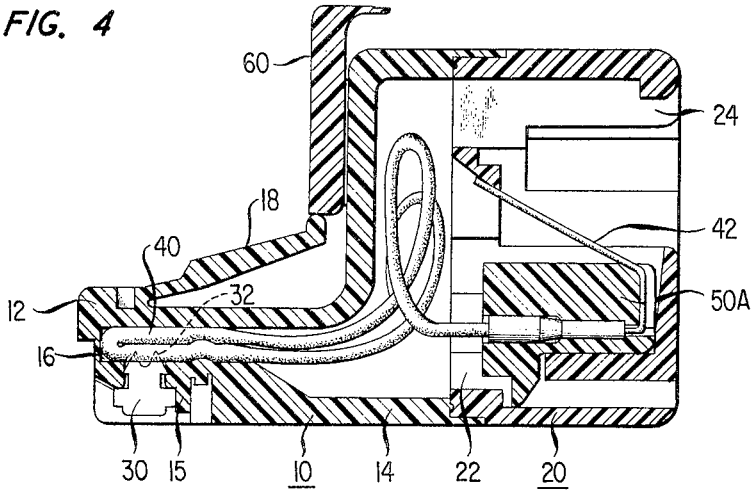
Figure 5:
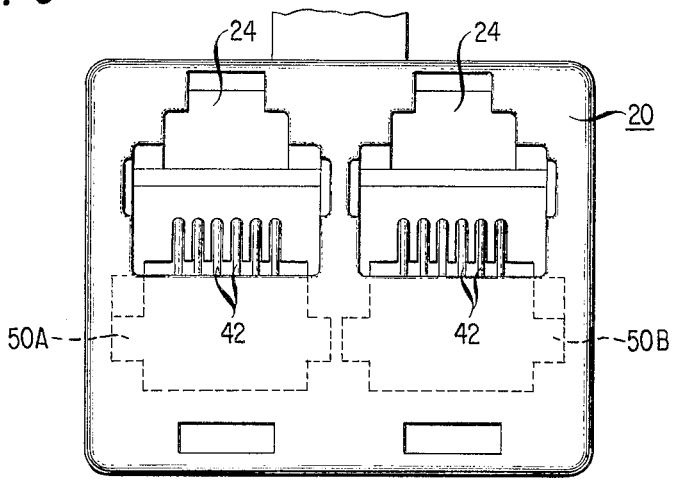
Figure 6:
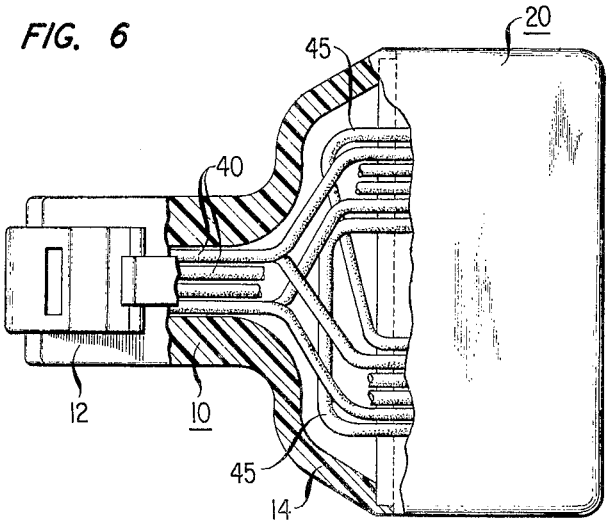

United States Defensive Publication [19] (H) [11] T958,009

Snyder [43] May 3, 1977

[54] ELECTRICAL ADAPTER

[75] Inventor: Dennis Rex Snyder, Indianapolis, Ind.

[73] Assignee: Bell Telephone Laboratories, Incorporated, Murray Hill, N.J.

[21] Appl. No.: 714,525

[22] Filed: Aug. 16, 1976

[51] Int. Cl.[2] ..... H01R 13/38

[52] U.S. Cl. ..... 339/99 R

[57] ABSTRACT

An adapter in accordance with the present invention comprises a male member joined to a female member. The male member includes a plug portion having a plurality of spaced slots into which a plurality of blade contacts are respectively inserted, the blade contacts making electrical connection with conductors positioned within troughs that respectively communicate with the slots. Each conductor is doubled over within its associated trough, and both ends of each conductor are terminated with a wire spring contact. The contacts at one end of these conductors are mounted in a first contact carrier, while the contacts at the other end are mounted in a second contact carrier. In addition, a plurality of conductors, also terminated at both ends with wire spring contacts, extend directly between the carriers.

The contact carriers are respectively accommodated within a pair of internally communicating openings in the female member in such a manner that the wire spring contacts are exposed within a pair of externally communicating openings of the female member. Each externally communicating opening is adapted to accommodate a plug having contacts arranged so as to engage the contacts of the associated carrier and thereby be electrically connected to the blade contacts in the plug portion and to the contacts of the other carrier.

5 Claims, 2 Sheets Drawing,

7 Pages Specification

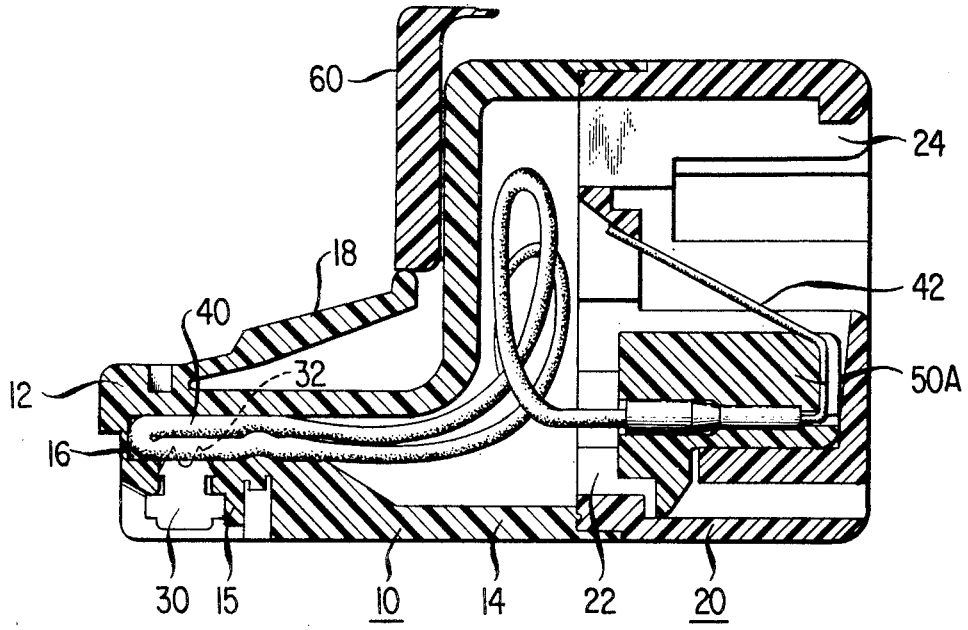

The file of this unexamined application may be inspected and copies thereof may be purchased (849 O.G. 1221, Apr. 9, 1968).